United States Patent
Alt et al.

(10) Patent No.: US 11,347,621 B1
(45) Date of Patent: May 31, 2022

(54) APPLICATION PERFORMANCE CHARACTERIZATION AND PROFILING AS A SERVICE

(71) Applicant: Core Scientific, Inc., Bellevue, WA (US)

(72) Inventors: Maxim Alt, San Francisco, CA (US); Paulo Souza, Maringa (BR); Gabriel Martin, Quintana de la Sirena (ES)

(73) Assignee: Core Scientific, Inc., Bellevue, WA (US)

( * ) Notice: Subject to any disclaimer, the term of this patent is extended or adjusted under 35 U.S.C. 154(b) by 0 days.

(21) Appl. No.: 17/204,481

(22) Filed: Mar. 17, 2021

Related U.S. Application Data (60) Provisional application No. 63/066,429, filed on Aug. 17, 2020, provisional application No. 63/065,003, filed on Aug. 13, 2020, provisional application No. 63/061,134, filed on Aug. 4, 2020, provisional application No. 63/054,458, filed on Jul. 21, 2020, provisional application No. 62/990,552, filed on Mar. 17, 2020.

(51) Int. Cl.
  *G06F 9/44* (2018.01)
  *G06F 11/36* (2006.01)

(52) U.S. Cl.
  CPC ...... *G06F 11/3612* (2013.01); *G06F 11/3688* (2013.01)

(58) Field of Classification Search
  CPC .................. G06F 11/3612; G06F 11/3688
  See application file for complete search history.

(56) References Cited

U.S. PATENT DOCUMENTS

| | | | |
|---|---|---|---|
| 8,296,419 B1 | 10/2012 | Khanna et al. | |
| 10,817,401 B1 | 10/2020 | Lewis | |
| 2003/0041316 A1* | 2/2003 | Hibbeler | G06F 11/3466 717/130 |
| 2009/0157811 A1* | 6/2009 | Bailor | G06F 16/1767 709/204 |
| 2009/0293051 A1* | 11/2009 | Krywaniuk | G06F 8/63 717/173 |

(Continued)

OTHER PUBLICATIONS

International Search Report and Written Opinion relating to corresponding International Patent Application No. PCT/US21/42439, dated Oct. 22, 2021.

(Continued)

*Primary Examiner* — Hang Pan
(74) *Attorney, Agent, or Firm* — Fishman Stewart PLLC (57) ABSTRACT

An improved system and method for characterizing application performance are disclosed. The system may comprise a profiling module and a web service module. The profiling module may be configured to prompt the user to select a public mode or a private mode and specify software and hardware targets for profiling. Test results from profiling may be combined with historical data obtained from a web service module providing access to a database of historical profiling test results to create recommendations for improving performance. The profiling module may upload the test-generated data in public mode to the web service module for use in future execution cycles or keep them private if in private mode.

18 Claims, 10 Drawing Sheets

(56) References Cited

U.S. PATENT DOCUMENTS

| | | | |
|---|---|---|---|
| 2010/0036981 A1* | 2/2010 | Ganesh | G06F 11/3612 710/38 |
| 2010/0192156 A1 | 7/2010 | Hollingsworth | |
| 2012/0149464 A1* | 6/2012 | Bone | G06F 9/5044 463/30 |
| 2012/0226788 A1 | 9/2012 | Jackson | |
| 2014/0075452 A1* | 3/2014 | Supalov | G06F 9/5066 719/313 |
| 2014/0089917 A1 | 3/2014 | Attalla et al. | |
| 2015/0066869 A1* | 3/2015 | Seto | G06F 21/31 707/688 |
| 2015/0317563 A1* | 11/2015 | Baldini Soares | G06N 20/10 706/12 |
| 2016/0019636 A1 | 1/2016 | Adapalli et al. | |
| 2016/0062880 A1* | 3/2016 | Moretto | G06F 11/3414 714/38.1 |
| 2016/0098334 A1 | 4/2016 | Hariharakrishnan et al. | |
| 2016/0224898 A1 | 8/2016 | Ryckbosch et al. | |
| 2017/0123773 A1* | 5/2017 | Gao | G06F 8/443 |
| 2017/0249192 A1 | 8/2017 | Thompson | |
| 2017/0373940 A1 | 12/2017 | Shahab et al. | |
| 2018/0365576 A1 | 12/2018 | Guttmann et al. | |
| 2019/0171483 A1 | 6/2019 | Santhar et al. | |
| 2019/0208009 A1 | 7/2019 | Prabhakaran et al. | |

OTHER PUBLICATIONS

Supplementary European Search Report for EP-18877280, dated Sep. 22, 2021.

* cited by examiner

APPLICATION PERFORMANCE CHARACTERIZATION AND PROFILING AS A SERVICE

CROSS-REFERENCE TO RELATED APPLICATIONS

This application claims the benefit of, and priority to, the following United States Provisional Patent Applications:
Ser. No. 62/990,552, filed Mar. 17, 2020,
Ser. No. 63/054,458, filed Jul. 21, 2020,
Ser. No. 63/061,134, filed Aug. 4, 2020,
Ser. No. 63/065,003, filed Aug. 13, 2020, and
Ser. No. 63/066,429, filed Aug. 17, 2020,
the disclosures of which are all hereby incorporated herein by reference in their entirety and for all purposes.

TECHNICAL FIELD

The disclosure relates generally to performance profiling and analysis, and more specifically to application performance characterization and profiling as a service.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many critical business processes rely on processing large amounts of data. This type of data analysis typically relies on long batch processes that perform data crunching in parallel on large numbers of processors (e.g., many nodes on cloud servers). Performance characterization and tuning of such processes is a critical task, potentially resulting in substantial cost savings that can be achieved by finding optimal computing resources, with optimal configurations and locations. Performance optimization of applications provides enterprises with opportunities to speed up their time to market within typical service level agreement (SLA) constraints such as price, performance, availability, and security. As time goes by, applications become more complex, business processes become more compute intensive and costly, and compute environments become more diverse, so that, ultimately, performance characterization and tuning become an integral and critical part of many enterprises and industries.

Typically, the performance characterization process of production high performance computing (HPC), artificial intelligence (AI), and machine learning (ML) commercial workloads takes months of complex business negotiations to allow access to proprietary code and datasets of interest by a third party, access to rare performance engineering skills, and complex performance tool installation processes.

In some cases, access to highly sensitive proprietary code and data is not possible, so commonly used performance analysis methods rooted in modeling the problem and user environment may be used instead. The process of creating such models is a time consuming and difficult task, and it often involves errors resulting in optimizing a model which may not reflect actual performance issues present at a user's site.

This problem becomes even more complex if comparing or correlating performance on two or more computing systems and on multiple runs is required. This type of comparison or correlation can be helpful to development operations (DevOps) personnel evaluating the performance of an application on an off-premises platform so that they may select a compute resource with an optimal profile.

There are many performance monitoring tools available, but many incur significant overhead and are difficult to port between computing platforms in a reproducible manner. Also, many of these tools often require code recompilation to link to special libraries in order to collect extra information. Performance analysis and characterization efforts are typically discrete to a single environment and are not programmatically put into correlation with performance data obtained on other platforms.

The performance data obtained from common performance tools must then be interpreted and understood before it can yield a conclusion on identifying a performance or scalability hazard. This is done by rare skilled performance engineers that are not always available at the time and place where the data collection runs were conducted. Many prior solutions to this problem are manual, and the tools are fragmented, tailored to a discrete environment, and complex to implement due to security concerns.

The end results and learnings after this time-consuming process are often isolated and not shared. With the performance analysis and characterization efforts typically being tied to a single environment, they were not often easily reusable.

For this reason, there is a desire for a solution that addresses one or more of these shortcomings. The foregoing discussion is intended only to illustrate examples of the present field and is not a disavowal of scope.

SUMMARY

An improved system and method for characterizing application performance is contemplated. A profiling module is downloaded to the user's network, and the user may select either a public mode or private mode based on their preferences and the confidentiality and proprietary nature of the applications, workloads and system configurations being characterized. The profiling module may run hardware and software profiling tests and may download prior result data (e.g., prior historical profiling tests from earlier runs) by accessing a web service that provides access to a historical performance database. By combining the historical profiling tests and the data from the hardware profiling tests and software profiling tests, the profiling module may make recommendations to the user to enable improved performance. If in public mode, the profiling module may contribute the test results back to the historical performance database for others to use in future runs of the profiling module. If the user desires to maintain the confidentiality of their workloads, data, and systems, the user may specify a private mode, and the profiling module will keep the data local.

In one example embodiment, the method for characterizing application performance comprises downloading a profiling tool, specifying software and targets to profile, prompting the user to select a public or private mode, and performing one or more tests on the target hardware and software. Additional prior result data may be downloaded (if any relevant results are available) from an external historical database of prior profiling test results. Based on the test results and the available relevant historical data, recommendations are offered to the user. In response to a public mode having been selected, the test results may be contributed back to the external database (e.g., uploaded via a web service). If private mode has been selected, the test results may be stored locally or encrypted and uploaded to a private portion of the external database that is only accessible to the user. The method may for example be implemented in software (e.g., as a set of modules on a non-transitory, computer-readable storage medium storing instructions executable by a computational device such as a computer to perform the method).

A system for characterizing application performance is also contemplated. In one example embodiment, the system comprises a profiling module and a web service module. The profiling module may be configured to: (i) prompt the user to select a public mode or a private mode, (ii) prompt the user to specify a software target and hardware target, and (iii) perform hardware and software profiling tests to generate a first set of data. The web service module may provide historical profiling test results to the profiling module, which the profiling module may combine with the test-generated data to create a set of recommendations. In public mode, the profiling module may upload the test-generated data and or recommendations to the web service module for use in future execution cycles.

In both the system and method, the recommendations may for example comprise compiler optimization settings, library recommendations, predicted execution times for selected data set sizes, system configuration recommendations such as the amount of memory to allocate per node, the number or ratio of GPUs to allocate per node, the number or ratio of CPUs to allocate per node, or a recommended type of interconnect between nodes.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
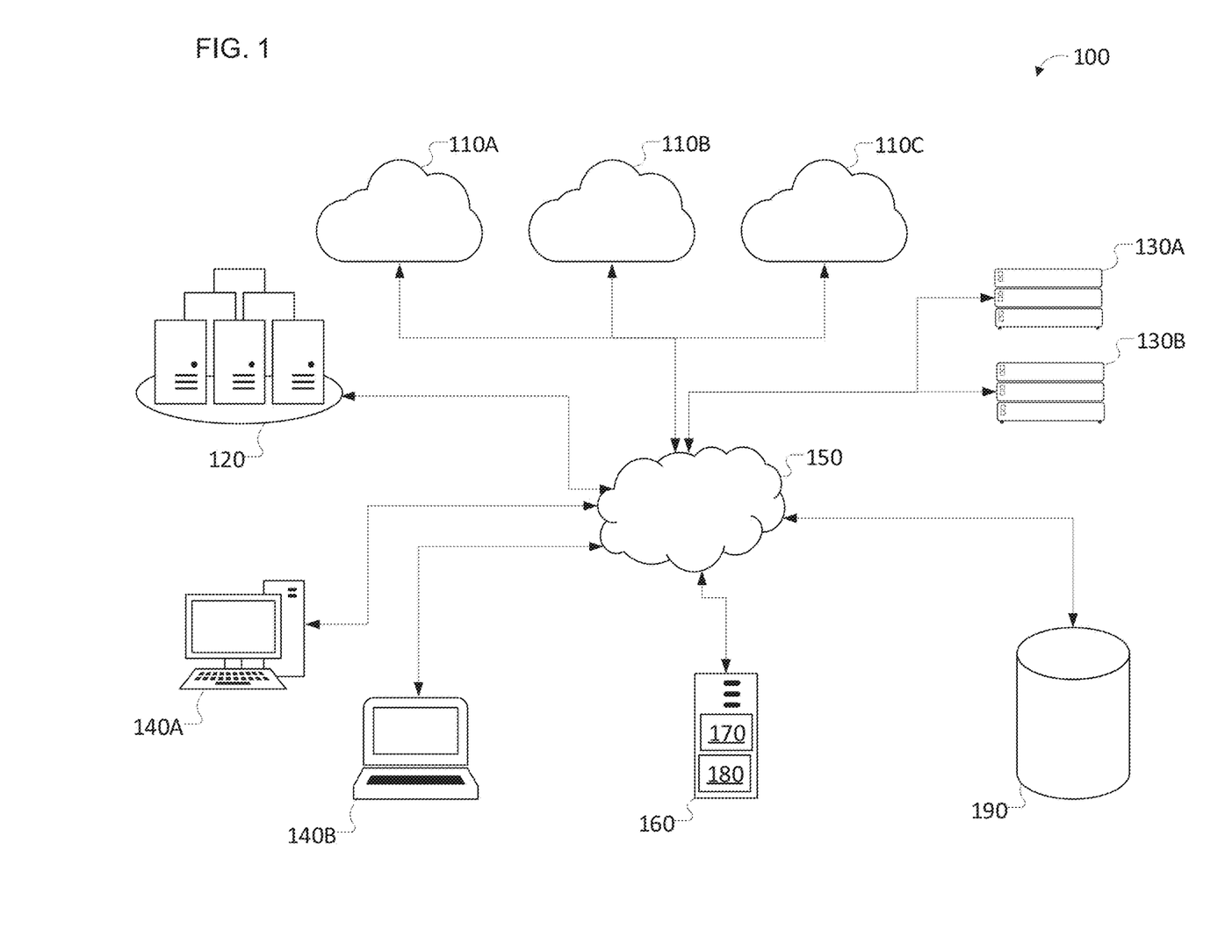
FIG. 1 is a schematic view generally illustrating an example of a system for characterizing application performance according to teachings of the present disclosure.

Turning now to FIG. 1, a schematic view generally illustrating an example of a system for characterizing application performance according to teachings of the present disclosure is shown. In this example, users access the system using local PCs 140A or mobile devices 140B (e.g., laptop computers) through a network 150 such as the Internet. The system comprises a server 160 which may offer a downloadable profiling module 170 and a web service module 180 that provides access to database 190 which stores historical profiling data from prior runs of profiling module 170.

Users may be attempting to characterize performance of applications on one or more HPC (high performance computing) clusters such as HPC cluster 120, public or private clouds 110A-C or on-prem systems 130A-B (e.g., bare metal servers or virtualized servers). These systems may offer CPUs (central processing units) and may also offer specialized compute nodes such as GPUs (graphics processing units), TPUs (tensor processing units), APUs (application processing units), or FPGAs (field programmable gate arrays). The systems may have different models or generations of processors, different quantities and types of memory, different interconnects (e.g., PCI-E, NVLink), and different IO (input output) and storage subsystems (e.g., disc, flash). Even within a single public cloud, the user may have many choices of system types (e.g., different numbers of processors, different amounts of memory, different interconnections, different ratios of CPUs to GPUs).

Modules 170 and 180 may be implemented in software (e.g., instructions stored on a non-volatile storage medium such as a hard disk, flash memory, or optical storage medium), but hardware implementations are also possible. Software implementations of modules 170 and 180 may be written in one or more programming languages or combinations thereof, including for example Java, Ruby, JavaScript, Python, C, C++, C#, or Rust. The instructions may execute on the server 160, partly on server 160 and partly on other computing devices in distributed computing system 100, or they may be downloadable on run locally or remotely.

The profiling module 170 may for example be downloadable by the user to their local PC, mobile device, or to their target system for profiling (e.g., HPC cluster 120, clouds 110A-C, or on-prem systems 130A-B. The profiling module 170 may for example present the user with controls to specify the target system or systems and application(s) to profile, and another control to specify whether a public mode or private mode should be used (e.g., based on their preferences and how sensitive the confidentiality of their applications, workloads and system configurations are).

Once the user's inputs to these controls have been received, the profiling module may run one or more hardware and software profiling tests. The profiling module may also contact the web service module and download prior historical profiling tests from earlier runs in historical performance database 190. Combining the historical profiling tests and the results data from the hardware and software profiling tests, the profiling module may make recommendations to the user to enable improved performance.

If in public mode, the profiling module may contribute the test results back to the historical performance database for others to use in future runs of the profiling module. If the user desires to maintain the confidentiality of their workloads, data, and systems, the user may specify private mode, and the profiling module will keep the data local or may store it in a restricted portion of the historical performance database 190 (e.g., encrypted so that only the profiling module being used by the user that generated the results data may have access).

The web service module 180 may for example be configured to respond to queries from the profiling module 170 and provide historical profile data from database 190. The web service module 180 may also be configured to receive new profiling data sent by the profiling module 170 when in public mode, and store that data into database 190. In some embodiments, historical performance database 190, web service module 180, and profiling module 170 may all be downloadable (e.g., as part of a single larger program or solution), in which case profiling module 170, web service module 180 and historical performance database 190 may all run on the same system and communicate locally.

Server 160 may for example be a generic PC or server (bare metal or virtualized), a specialized appliance, or one or more nodes within a larger cluster. Server 160 may be configured with one or more processors, volatile memory and non-volatile memory such as flash storage or internal or external hard disks (e.g., network attached storage accessible to server 160).

In some embodiments, the web service or profiling modules may also provide a predictive multi-cloud benchmarking and performance correlation service. This may help users to evaluate and predict cloud performance of an application of interest given known performance characteristics on-premises, on bare metal instances in the cloud, or in virtual cloud instances. The module may correlate on-premises and cloud performance of given HPC or AI applications or industry benchmarks. Based on the aggregate crowdsourced historical performance database, those correlation models of application or benchmark performance can be used for recommendation of optimal CSP ("Cloud Service Provider") configurations for each workload. The web service module may also provide a prediction of a given application's price (e.g., cost to execute) or performance (e.g., time to solution) in different cloud configurations.

In some embodiments, the web service or profiling modules may also run analytics (based on the historical performance database) and provide information regarding one or more of the following:

1. Which, if any, of the prior known applications or benchmarks in the database are most likely to have performance characteristics similar to the application of interest to the user. In some embodiments, this may be calculated based on a decomposition of the application's performance (e.g., a performance spectrometer signature).
2. Given the known application and benchmark performance data in the database, and given the application of interest's performance in one environment (cloud or on-premises), how that application would likely perform in another environment (e.g., a different cloud or on-premises environment).
3. Given the known application and benchmark performance in the database, and given the application of interest's performance on-premises or in one cloud environment, what would be the recommended cloud instance configuration for price optimized cloud performance (recommendation for optimization function).

In addition to collecting data from tests run by the profiling module, the historical performance database may also be seeded by running experiments such as benchmarks that measure performance in a variety of cloud environments. These data mining experiments can be guided by the correlation model itself to fill in performance data points where there are gaps. As part of the seeding process, known selected open-source applications and benchmark data on CSP instances in a reference table may be gathered (e.g., by crowdsourcing all or part of the historical performance database). For example, users may elect to contribute to this database based on the applications and systems to which they have access (and are permitted to share without violating confidentiality requirements).

In some embodiments, the web service module may permit the user (e.g., through the profiling module) to request other users to run a new app/benchmark on all CSPs (or a selected subset of CSPs that are of interest) and get the data added to the historical performance database (e.g., optimized container and right-sized CSP clusters configurations). The user may for example be provided CSP credits; or a user can run the application or benchmark in their own environment (under their account) and ask the profiling module to collect the data, interpret it, and then add it to the performance database (e.g., via the web service module). For example, this could be done in a cloud sandbox available on a CSP marketplace to evaluate performance of the cloud in comparison with other data points. If the user does not wish to share performance data and add their performance data points to the global database for the benefit of others, the user would have an option to select a private mode and utilize a benefit of access to that database and privately augment it for only their private data correlations and interpretation. The service may for example be made available for free (or for a reduced fee) for users that share their data and for a fee (or higher fee) for users that are unable to share their data for confidentiality reasons.

In some embodiments, users would have this flexibility to easily contribute to the private or public performance database with applications and benchmarks of their choice, beyond the default ones provided with the public service. This service may combine public applications and benchmarks, finding similarities and defining a distance function between them. It may also detect public applications and benchmarks similarities in relation to resource utilization. Those similarities may also be tracked in the historical performance database.

In some embodiments, the profiling module may provide optimized compute resource selection recommendations and private performance characterization services. The profiling module and or web service module may for example interpret privately gathered performance data in relation to other historical performance data (seeded and crowdsourced). In some embodiments this may include a service available in private mode that provides ranks given a set of queues in relation to specific application performance. For example, this may be a proprietary service where users are identifiable and sign in, and which allows users to privately store their historical performance data points (e.g., encrypted) and add these to the correlation process. That proprietary nature of this service would isolate compute resources available for correlation. This hybrid service is made aware of particular proprietary on-premises and cloud environments that are not visible to the public. The optimal resource selection (queues) may be performed within this private subset of resources. Access to the data used may be kept private and isolated, i.e., limited to the scope of the specific private environment (e.g., applications, user group, queues, historic performance data points). However, the profiling and web service modules may nevertheless access the public portions of the historical performance database to correlate the hybrid performance database (e.g., as a hybrid performance characterization service that preserves the proprietary nature of user's performance data when in private mode).

In some embodiments, the private mode may be implemented with the following controls:

1. A control to specify a desired compute resource selection policy: example, performance or price/performance;
2. To aid in correlating the user input workload, the user may be provided a control to specify a reference CSP instance for correlation (e.g., specify which instance type is most similar to the hardware in which the job was run or the hardware specification such as the number of cores, amount of memory, etc.); and
3. A control to display a cluster of applications and benchmarks (private and or public) from the historical performance database which have similar resource utilization characteristics on a given hardware platform.

In some embodiments, the system may permit crowdsourcing of performance data, which allows better prediction and correlations through the use of more data. The profiler module may be configured to gather and analyze performance data limiting overhead in a way that would be beneficial for optimizing usage of compute resources. This may permit performance characterization of private systems and or applications without requiring access or revealing proprietary code or data. By providing a downloadable profiling module that can be run by the user when executing their application on their target environment (running both standard benchmarks and collecting performance data while running the user's application), more performance data can be collected, thereby improving the profiling capabilities of the system and encouraging the porting of the evaluation module (e.g., if open source) to a wide variety of computing environments (e.g., for public benchmarking of various bare metal and cloud computing platforms). The system may thus permit correlations of performance data between a wide variety of computing environments and may generate recommendations regarding optimal configurations of computing systems.

In some embodiments, the system may comprise (as part of the profiling module and the web service module) an integrated suite of tools for measurement and analysis of an application. It may provide performance profiling to suit multi-tiered cloud and on-premises environments of different types and sizes. The system may be implemented as packaged software for deployment on-premises or in a Software-as-a-Service (SaaS) model, or as an integrated service for cloud or system vendors.

Figure 2:
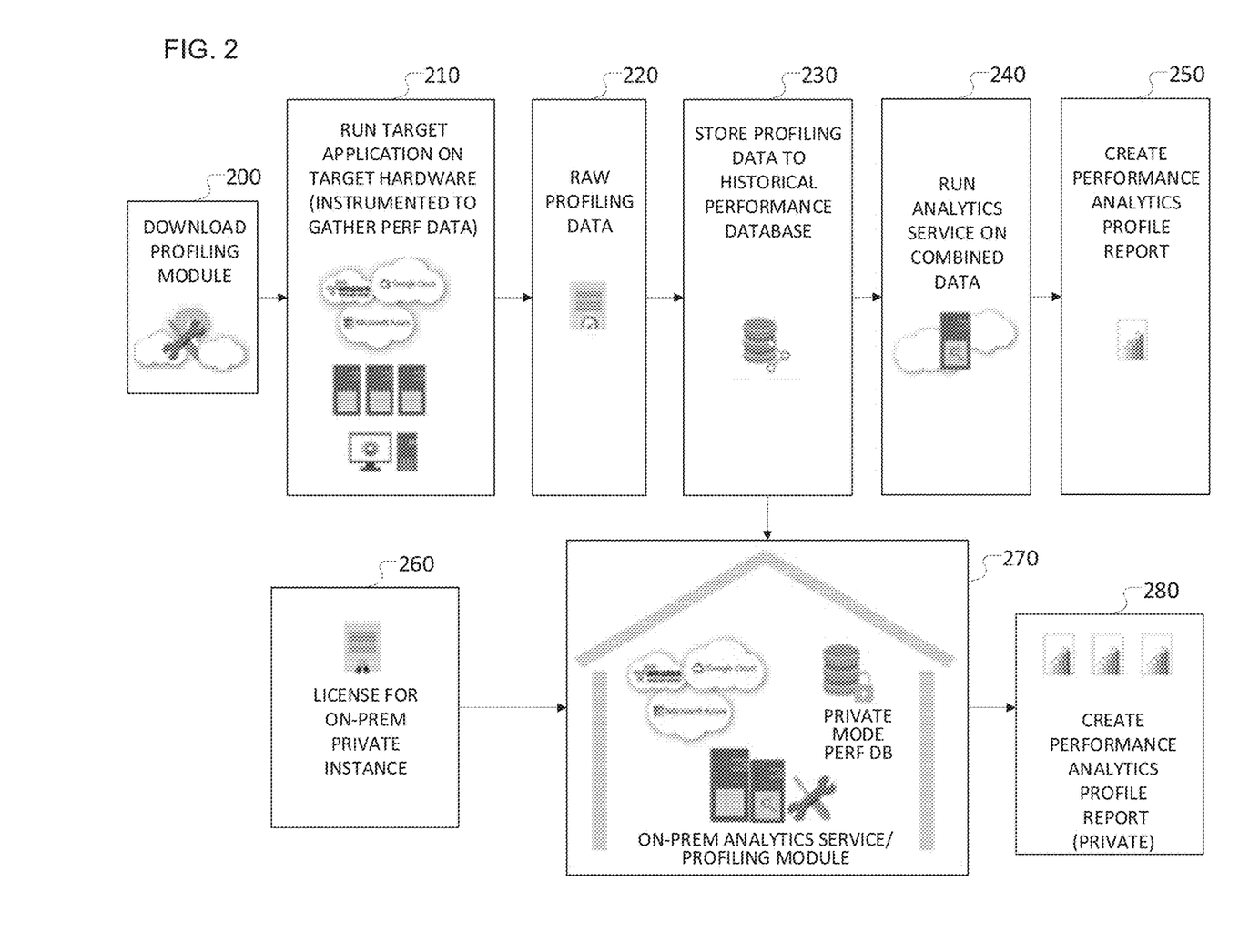
FIG. 2 is a flow diagram generally illustrating an example of a method for characterizing application performance according to teachings of the present disclosure.

Turning now to FIG. 2, a flow diagram generally illustrating an example of a method for characterizing application performance according to teachings of the present disclosure is shown. The profiling module is downloaded (step 200) and may be used to run standalone performance data gathering tools in a customer environment (step 210). The profiling module may install performance monitoring tools and interception libraries (e.g., perf, netstat, mpstat) to gather message passing interface (MPI) and input output (I/O) information and provide guidance (e.g., prompting the user to enter configuration information) to gather performance information from bare-metal, virtual machine and or containerized executions of the target application or applications. The gathering may occur in the target environment without modeling using a replica in a third-party environment. The performance data gathering tools may be configured to run without modification to users' applications in their operating environment. This may improve the accuracy and simplify the performance data recording process.

Once the profiling module has completed installing the performance monitoring tools and libraries, the users may launch jobs and services with execution wrappers (e.g., available as open source software downloadable from a publicly available website). Wrappers may be provided for different container formats (e.g., Docker containers), to provide portability and make performance profiling environments consistent across different platforms, with build and install scripts provided to make these wrappers easy to use.

Collection of performance data may for example include, but not be limited to, obtaining hardware or software counters, the utilization rates of platform components (e.g., 10 utilization), system utilization (e.g., CPU utilization, GPU utilization), and calls to user functions. Different sampling intervals may be used, and the data may be gathered for on-premises platforms, off-premises or cloud platforms, bare metal or virtual platforms, or combinations thereof, depending on what target system or configuration the user specifies.

The performance data captured (step 220) may be structured and uninterpreted performance data from one or more single-node or multi-node runs. This raw performance data (e.g., text-based log files) may optionally be made locally available to the user. The performance data gathered may for example indicate how well a target application is executing on a target machine. In some embodiments, it may not contain information about what the job is processing, or the specific data it is producing and may instead track how well the target application is running on the target hardware, and how well that combination is making use of the available system resources. For example, in some embodiments for each job submitted a workload ID (provided by the user), machine ID (optional and provided by the user), system-wide stats, hardware counters and MPI+I/O calls may be collected. The gathered information may also include the number of machines per job, machine specification like the CPU/GPU model, ratio, and the amount of memory per machine, plus job start and finish times, CPU/GPU utilization and the type, size, duration, and the total number of MPI and IO calls.

If the profiling module is operating in a public mode, this raw profiling data may be stored to the historical performance database (step 230), and then analytics may be run on the data combined with existing historical performance data previously in the database (step 240).

For embodiments that do not include information about the data being processed, the user may elect to use the public mode even though they want to maintain the confidentiality of their data. They may for example be incentive to contribute to a larger pool of performance data to further the accuracy of the global performance characterization database and analytics engine by providing sophisticated visualization reports of performance data (step 250) such as a performance spectrometer and additional information regarding correlations. This incentive along with an assurance that information related to the user's actual data being processed is not included may enable more users to share their performance data with others via the historical performance database, and hence improve the overall service.

Anonymous users may also be supported by not tracking IP addresses and allowing them to download the profiling module and upload their per-job performance data in a raw form from the run-time of the job (which can be containerized or not) on a variety of in-house or off-premises or CSPs ("Cloud Service Providers"), which may be public, private, or a hybrid. This anonymous data may be validated to ensure it is valid before it is accepted into the historical performance database, and in some embodiments, it may be identified as anonymously sourced and potentially given less weight than data from an identified source.

In some embodiments, the publicly available web service may be configured to pull and use anonymized data. The users may be prompted to give consent on releasing the performance data for interpretation by an external service. Anonymous users may for example upload per job raw performance data to that external service in raw form collected during the job execution on a variety of in-house or CSP compute resources. This anonymized data may be added to the pool of performance data (global historical performance database) for future interpretation use for all user's benefit. In some embodiments, a downloadable anonymous app performance analysis link may be provided along with a secret key for additional security. Only users who know the link and have the key may obtain access (e.g.: https://service.web.address/analysis/df28b2b33db59d-8c 374b90f4efd2089402157c600ab4b812f5c7cdcbf403b3de). In some embodiments the web service module may include user interface component that optionally permits user to sign-up to manage (monitor, store, search) their own collected performance data (which may be public or private). A service provider operating the web service module may for example decide which interpretation service requires sign-up or payment, or which are free of charge and anonymized.

For illustration purposes, in one example embodiment the service may not require sign-in and provide free of charge for analysis of bottlenecks and a type of resource constraint. The cloud hosted interpretation service may fully characterize the performance of the given job run, and it may provide graphs and charts for thorough analysis of CPU and memory bound performance limitation. Using performance plotting techniques as described in greater detail below, users may detect distinct resources which have utilization patterns indicative that they are limiting performance, as well as define a performance signature of the application.

In some embodiments, the profiling module and web service module may be run locally (step 270). This may be on-premises at the user's location and on the user's local systems, or on cloud computing accounts the user controls, or on a hybrid of the two. In some embodiments, the historical performance database may still be remote. In other embodiments, the entire system including the historical performance database may be downloaded, licensed (step 260), installed and run locally. The performance analytics reports created (steps 250 and 280) may be different based on the licensing module uses in order to incent sharing, or they may be same (e.g., if the private mode user has paid for a license fee).

In some embodiments, one or more of the following may be performed in the performance analysis and analytic service and provided in the performance analytics profile report: interpretation of performance data, visual representation of performance data and charts, correlation of performance data between different runs of applications or benchmarks on variety of systems in cloud or on-premises in virtual or bare metal environments, benchmarking, application of statistical or machine learning methods on performance data to derive performance characteristics, application performance characterization and performance sensitivity analysis, Hardware resource utilization patterns, and recommendations on (i) how to reduce hotspots, (ii) software optimizations most likely to have the greatest impact on improving performance, and (iii) the configuration options most likely to improve performance or reduce computing resource constraints.

In FIGS. 4 through 10 further below, examples of the analysis reports that the system may provide (e.g., in steps 250 and 280) are shown. These charts, histograms, and visualization techniques may provide users with helpful insights and recommendations regarding hotspots for the application, primary performance inhibitors, and resources utilization. These recommendations may include, but not be limited to, charts, tables and visual representation of performance data, performance logs, ratios or statistical functions over performance data, interpolations or extrapolations of performance data, as well as derived correlations or patterns or identification signatures/fingerprints.

Figure 3:
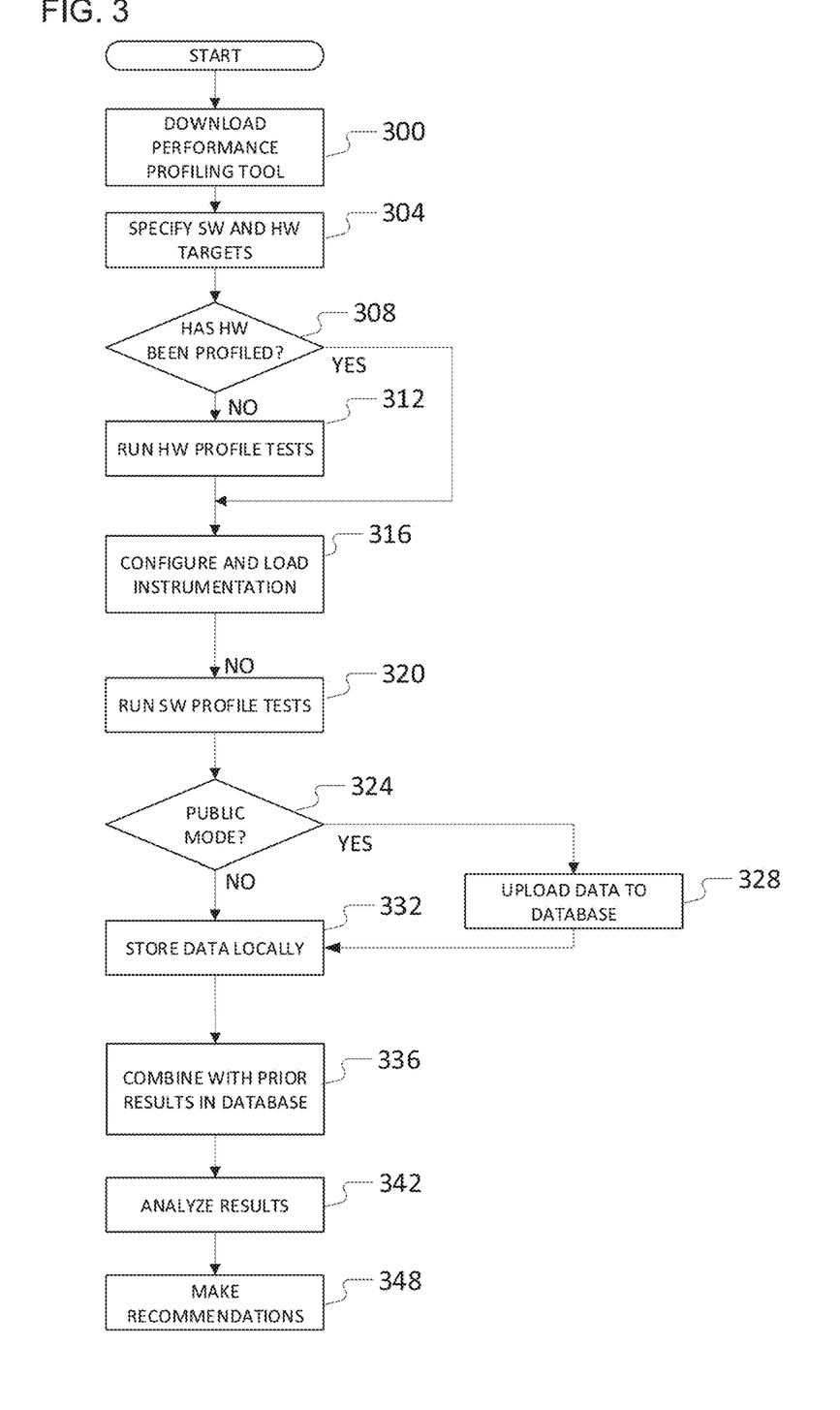
FIG. 3 is a flow diagram view generally illustrating another example of a method for characterizing application performance according to teachings of the present disclosure.

Turning now to FIG. 3, another flow diagram view generally illustrating another example of a method for characterizing application performance according to teachings of the present disclosure is shown. In this embodiment, a performance profiling module is downloaded (step 300), e.g., from a publicly available web server. The performance profiling module prompts the user to specify the application target (e.g., software workload) and hardware target to be profiled (step 304).

In some embodiments, if the hardware has not already been tested, i.e., data for it is present in the historical performance database (step 308), common hardware characterizing benchmarks may be executed to gather data about the hardware environment e.g., separate from the target software (step 312). Instrumentation for profiling the target application on the target hardware may be configured and loaded (step 316). For example, a Docker container with selected tools such as perf and netstat may be created to run the target application on the target hardware system. The target application be executed on the target platform, and the resulting performance data may be gathers (step 320).

If the user is operating in public mode (step 324), the performance data may be uploaded to a public instance of the historical performance database (step 328). The data may also be stored locally (step 332). The performance data collected may then be combined with existing data from the historical performance database (step 336), the results analyzed (step 342), and recommendations may be made (step 348). As noted above, recommendations may include recommended system configuration changes to improve performance. Example recommendations include changing the number or ratio of CPUs/GPUs to a certain recommended number, changing storage subsystem types (e.g., to solid state storage), switching libraries, or compiler settings used, etc. For example, if the target application and target system are similar or identical to an existing application and system combination previously profiled in the historical performance database but using a different library or different compiler (or compiler settings) and with lower performance, a recommendation to use the other library/compiler (or compiler settings) may be made. Other example recommendations may also include visual performance indicators such as performance spectrographs, histograms, and hotspot charts that visually indicate to users which system configuration changes would most improve performance, e.g., the bandwidth per process ID, hotspots per process id, an indicator of whether a solid state storage subsystem would benefit performance, etc.

Figure 4:
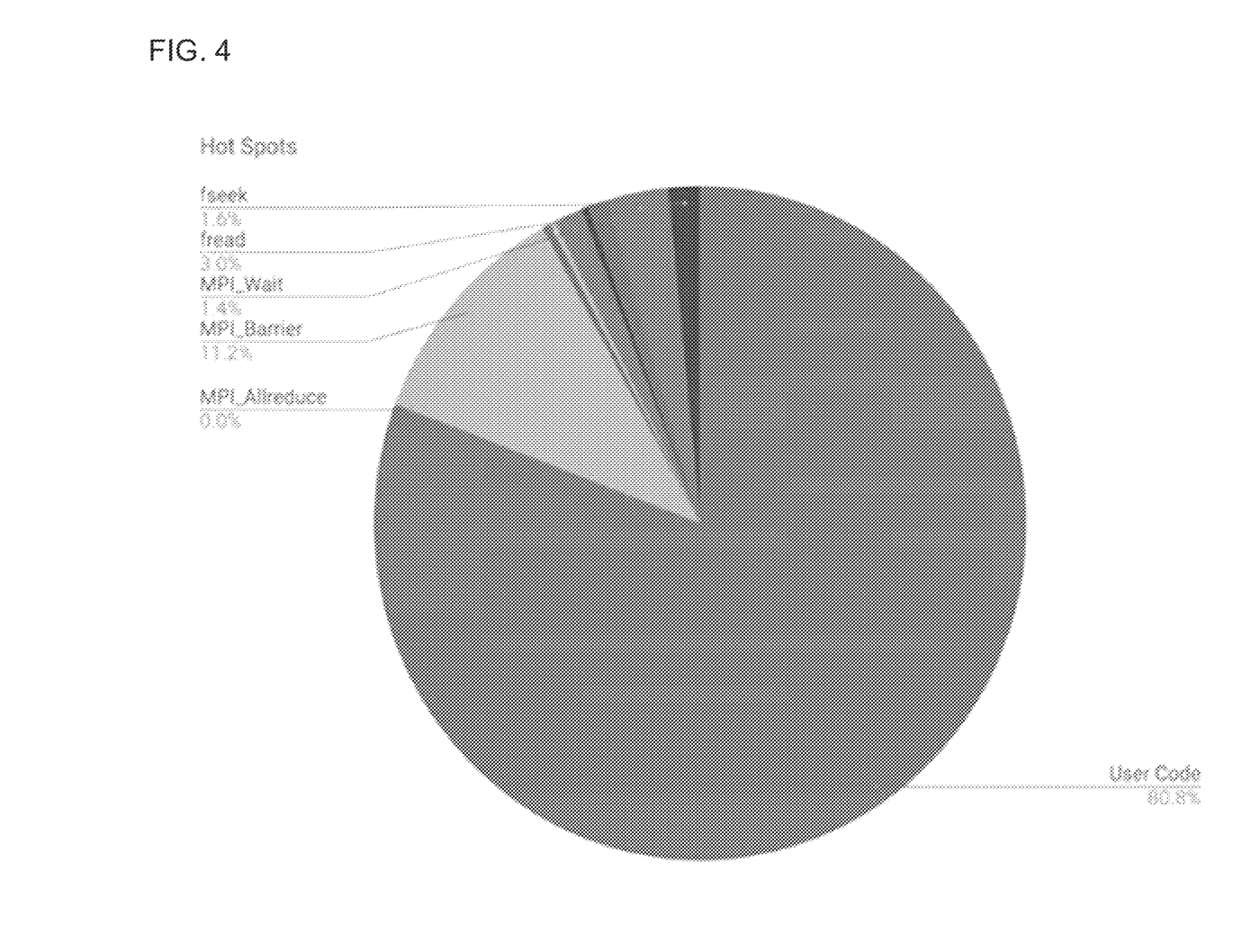
FIG. 4 is a diagram generally illustrating an example of a hot spot chart according to teachings of the present disclosure.

Turning now to FIG. 4, a diagram generally illustrating an example of a hot spot chart according to teachings of the present disclosure is shown. In this example, the hot spot chart shows the functions that are using more time, thereby providing the user insights on where turning efforts are most likely to improve the execution time of the application.

Figure 5:
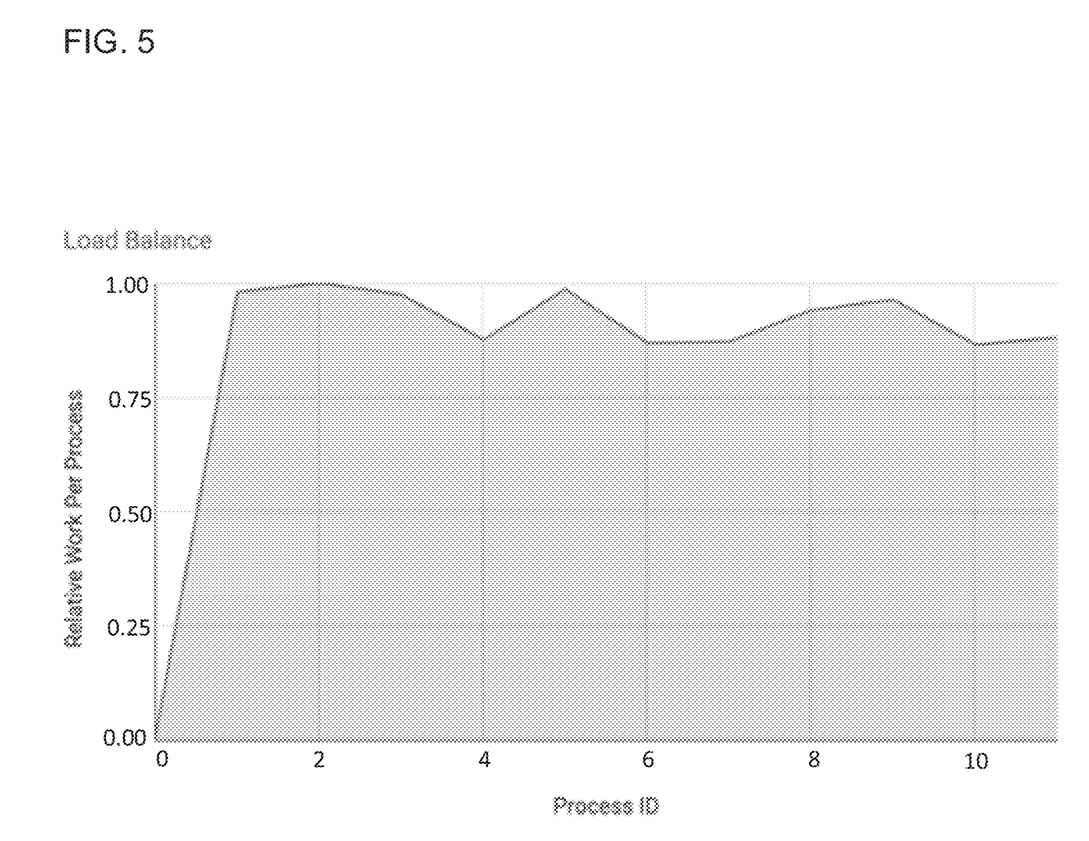
FIG. 5 is an example load balance graph according to teachings of the present disclosure.

Turning now to FIG. 5, an example load balance graph according to teachings of the present disclosure is shown. In this example, the graph may be used to determine if one process is taking more time than the others, thereby negatively impacting the load balance. If the amount of unbalance reaches some predetermined threshold, a recommendation may be generated for the user regarding the load balance issues.

Figure 6:
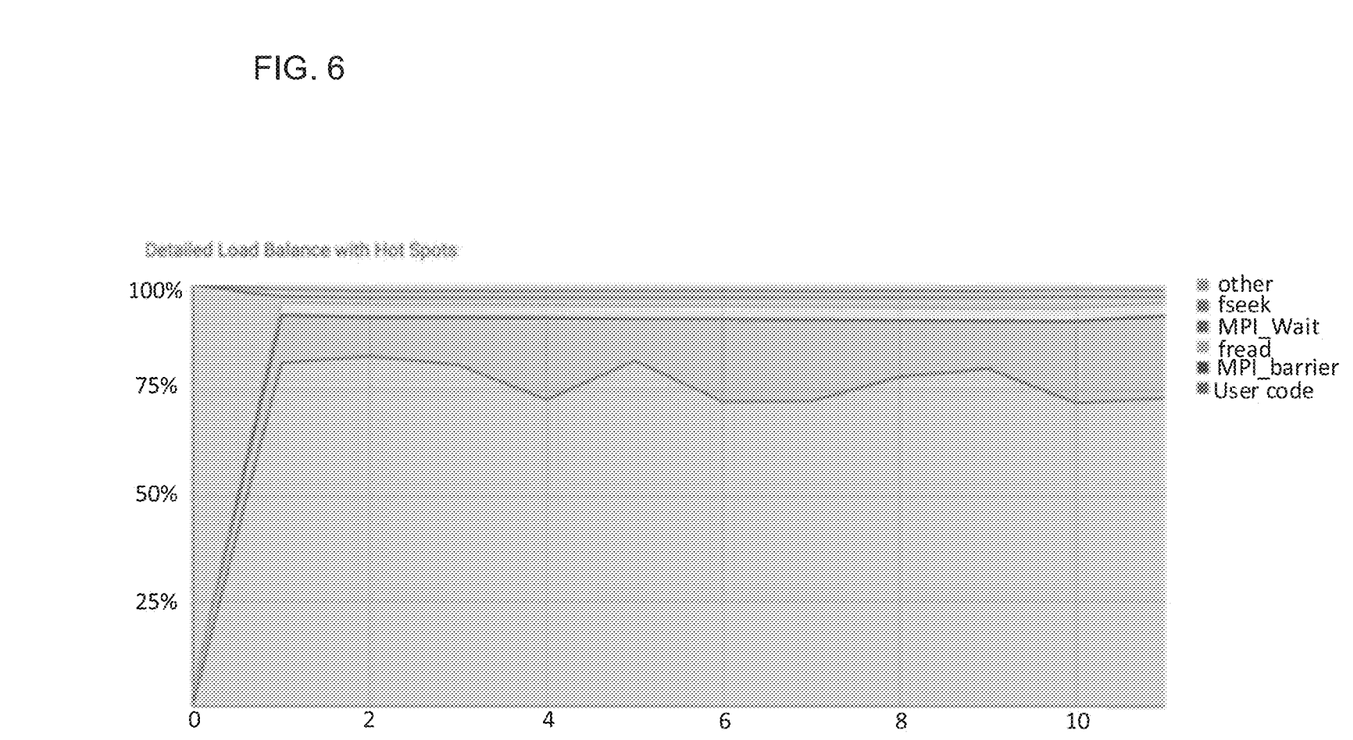
FIG. 6 is an example a detailed load balance graph of the present invention with hot spots according to teachings of the present disclosure.

Turning now to FIG. 6, an example a detailed load balance graph of the present invention with hot spots according to teachings of the present disclosure is shown. This graph combines both load balance and hot spot information. For example, for intercepted functions information may be provided regarding data sizes, which may be useful to identify bad I/O and MPI patterns, and to help the user to pick the right type of hardware. For example, if the largest portion of the time of an I/O function is spent on small sizes, a solid-state storage subsystem may significantly improve the performance relative to a disk-based storage subsystem.

Figure 7:
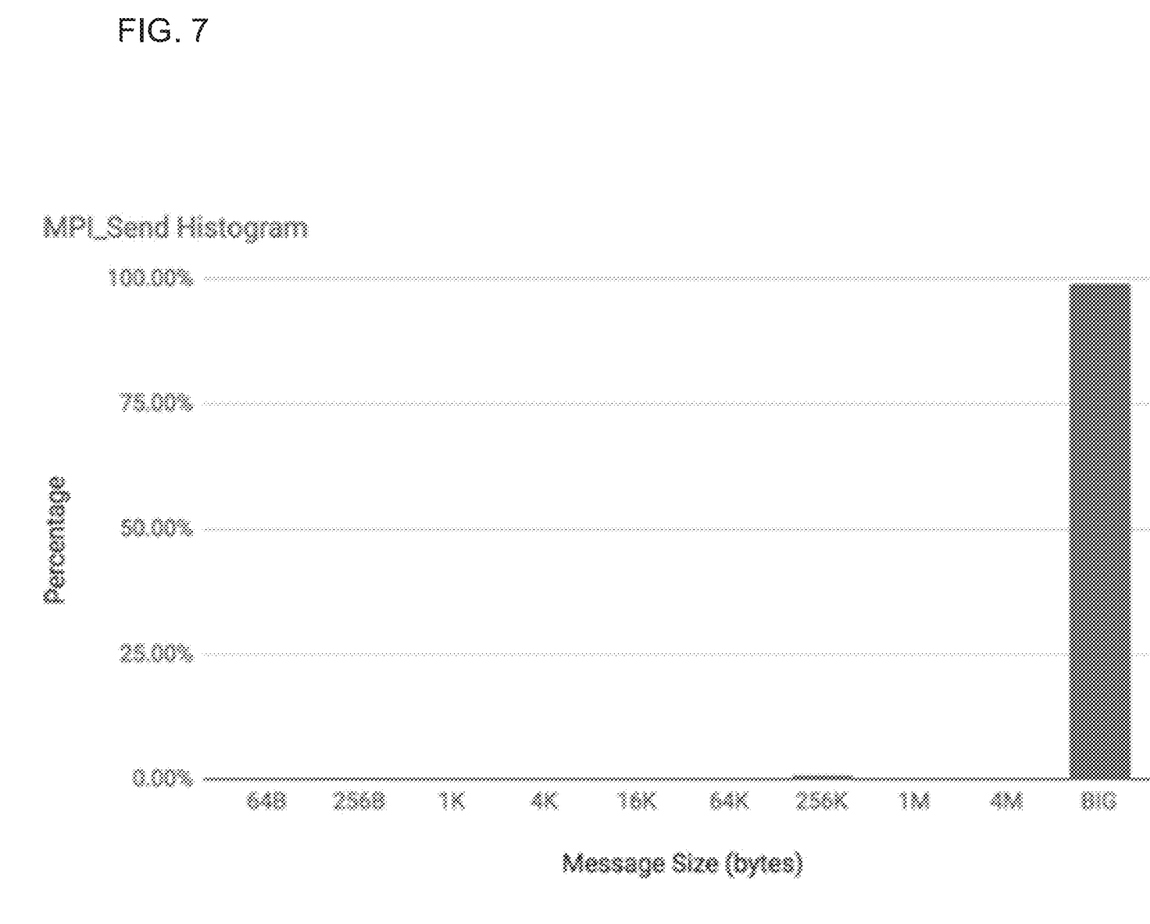
FIG. 7 is an MPI_Send histogram according to teachings of the present disclosure.

Turning now to FIG. 7, an example MPI_Send histogram according to teachings of the present disclosure is shown. In this example, the time spent on MPI_Send is grouped by the message size.

Figure 8:
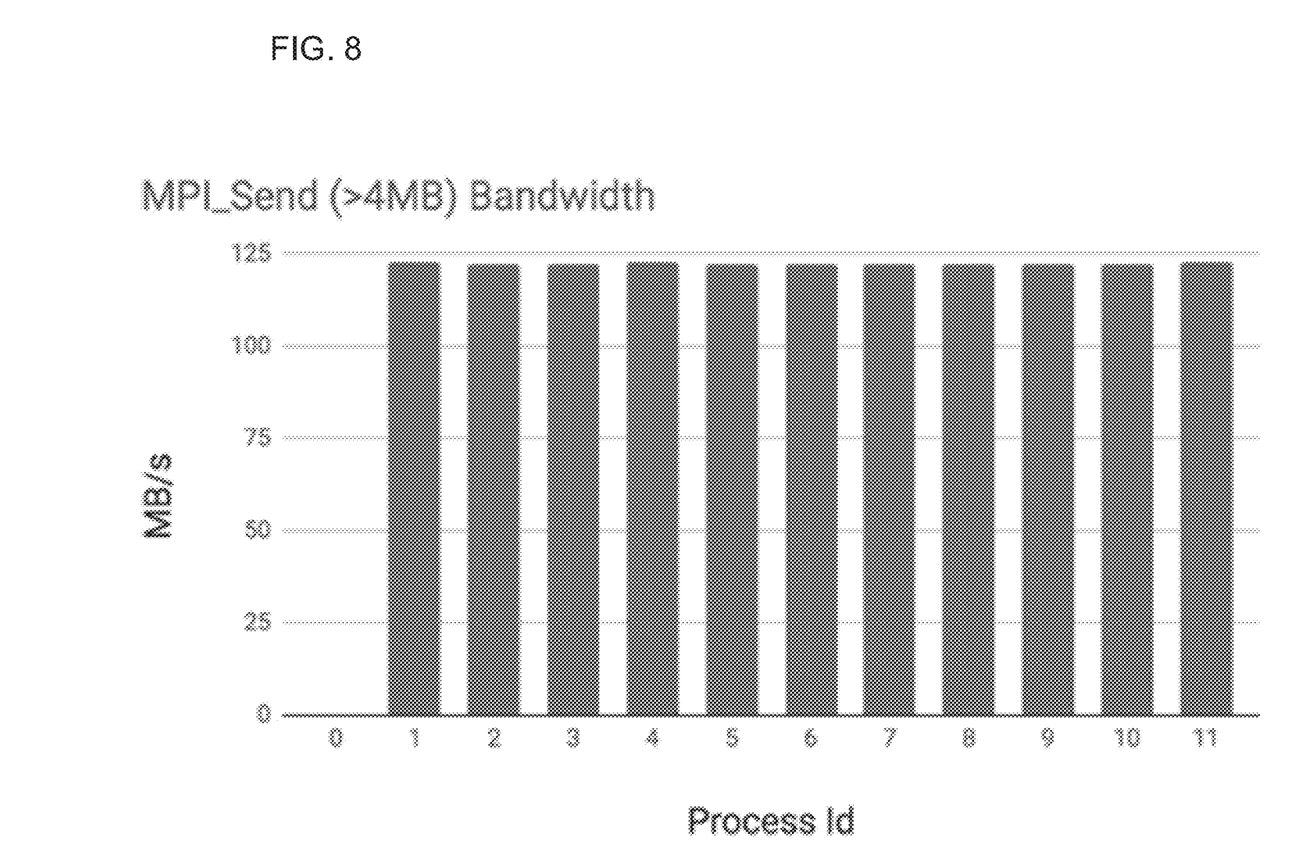
FIG. 8 is an MPI_Send (>4 Megabyte) bandwidth graph according to teachings of the present disclosure.

Turning now to FIG. 8, an example MPI_Send bandwidth graph for messages larger than 4 Mbytes according to teachings of the present disclosure is shown. For each process, the performance of that particular function/message size can be tracked.

Figure 9:
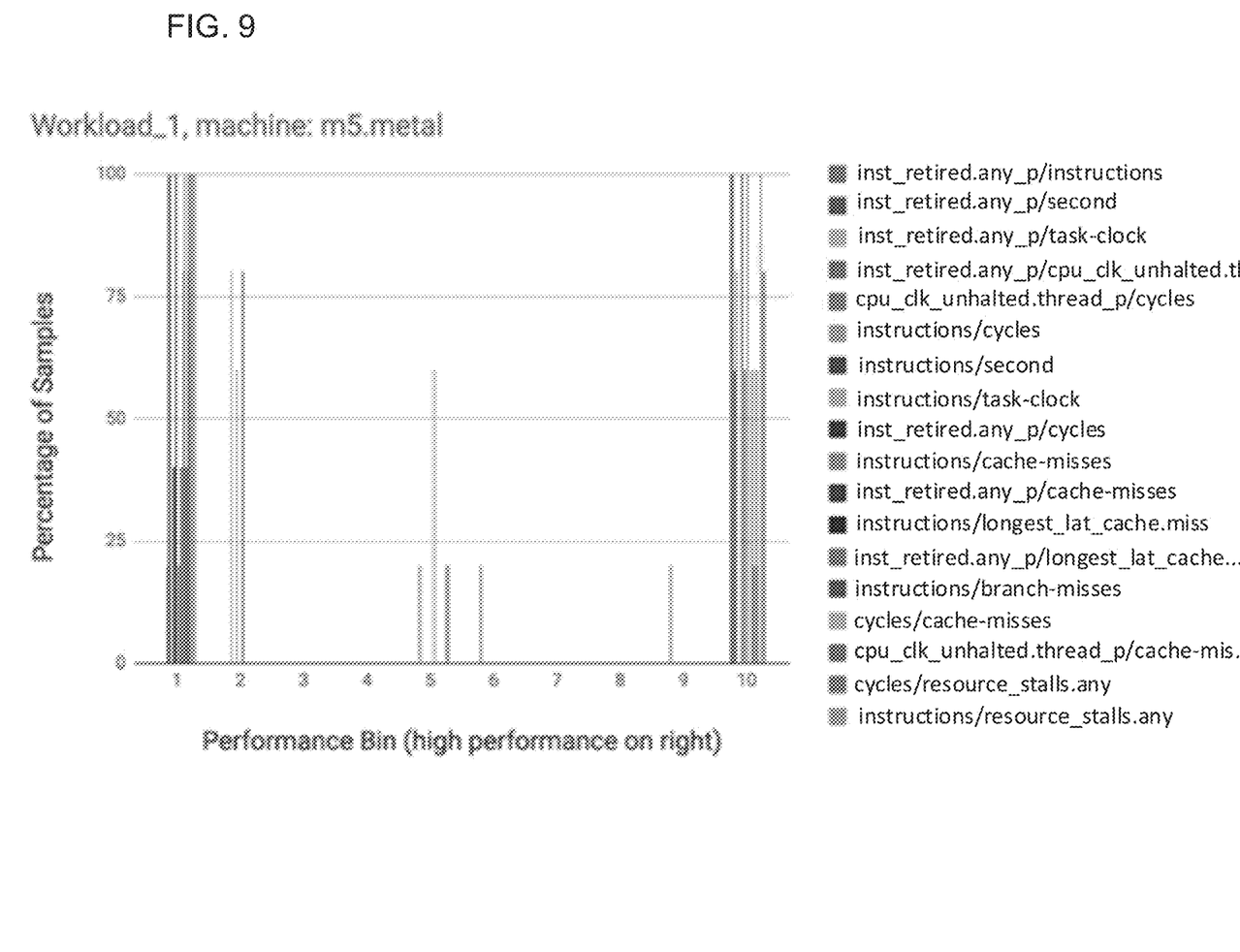
FIG. 9 is a workload graph according to teachings of the present disclosure.
Figure 10:
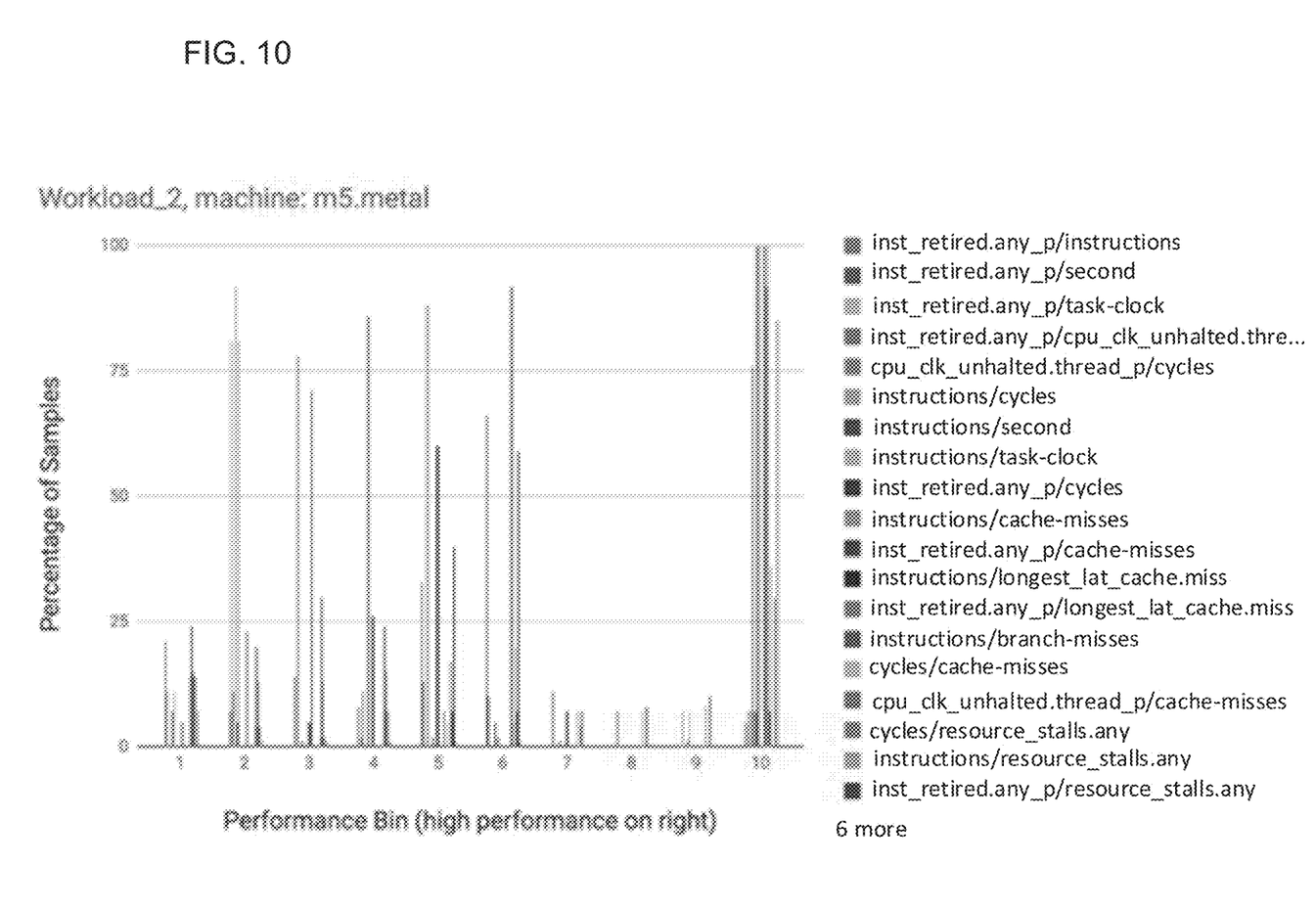
FIG. 10 is another workload graph according to teachings of the present disclosure.

Turning now to FIG. 9 and FIG. 10, two workload graphs according to teachings of the present disclosure are shown. These figures illustrate a visual performance signature of a pair workload on a particular machine. This type of performance signature is called an application performance spectrometer. These figures show two completely different workloads on the same machine. For simplicity, only a subset of all available metrics are plotted in this example. The system and users a can use this visual tool to identify performance weaknesses and find similar workloads.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for characterizing application performance, the method comprising:
   downloading a profiling tool;
   specifying a software target and a hardware target,
   performing a hardware profiling test to obtain a first set of results;
   performing a software profiling test to obtain a second set of results;
   downloading prior result data from an external database of prior profiling test results; and
   providing recommendations based on the first set of results, the second set of results, and the prior result data;
   wherein the recommendations include (i) a modification to the hardware target that would improve application performance, and/or (ii) a modification to the software target that would improve application performance;
   wherein the recommendations comprise a MPI_Send bandwidth per process ID and a recommended type of interconnect between nodes.

2. The method of claim 1, further comprising:
   determining whether a public mode or private mode has been selected; and
   in response to determining that the public mode has been selected, uploading the first set of results and the second set of results to the external database of prior profiling test results.

3. The method of claim 2, further comprising:
   in response to determining that the public mode has been selected, uploading the recommendations to the external database of prior profiling test results.

4. The method of claim 1, wherein the recommendations comprise a performance spectrometer.

5. The method of claim 1, wherein the recommendations comprise predicted execution times for selected data set sizes.

6. The method of claim 1, wherein the recommendations comprise a graph depicting load balance with hotspots per process ID.

7. The method of claim 1, wherein the recommendations comprise a hotspot graph identifying potential hotspots via depicting an amount of time spent on each of a plurality of processes.

8. The method of claim 1, wherein the recommendations comprise a recommended number of GPUs or CPUs to allocate.

9. The method of claim 1, wherein the recommendations comprise an indicator of whether a solid state storage subsystem would benefit performance.

10. The method of claim 1, wherein the recommendations include a visual performance indicator, the modification to the hardware target that would improve application performance, and the modification to the software target that would improve application performance.

11. The method of claim 1, wherein the recommendations include:
    a performance spectrometer;
    an indicator of whether a solid state storage subsystem would benefit performance; and
    a set of compiler optimization settings.

12. A system for characterizing application performance, the system comprising:
    a computer server including at least one processor, the computer server is configured to:
    (i) prompt a user to select a public mode or a private mode,
    (ii) prompt the user to specify a software target and hardware target, and
    (iii) perform hardware and software profiling tests to generate a first set of data; and
    the computer server receives historical profiling test results from a web service module;
    wherein the computer server combines the first set of data and the historical profiling test results to create a set of recommendations; and
    wherein the set of recommendations are uploaded by the computer server to the web service module if the computer server is in the public mode;
    wherein the recommendations comprise a MPI_Send bandwidth per process ID and a recommended type of interconnect between nodes.

13. The system of claim 12, wherein the set of recommendations comprise compiler optimization settings.

14. The system of claim 12, wherein the set of recommendations comprise library recommendations.

15. The system of claim 12, wherein the set of recommendations comprise a performance spectrograph.

16. The system of claim 12, wherein the set of recommendations comprise an amount of memory to allocate per node.

17. The system of claim 12, wherein the set of recommendations comprise:
    a number of GPUs to allocate per node;
    a number of CPUs to allocate per node; and
    a recommended type of interconnect between nodes.

18. A non-transitory, computer-readable storage medium storing instructions executable by a processor of a computational device, which when executed cause the computational device to:
    prompt a user to specify a software target and a hardware target;
    perform a hardware profiling test on the hardware target to obtain a first set of results;
    perform a software profiling test on the software target to obtain a second set of results;
    download prior result data from an external database of prior profiling test results;
    make recommendations based on the first set of results, the second set of results, and the prior result data;
    prompt the user to select either a public mode or a private mode; and
    in response to determining that the public mode has been selected, uploading the first set of results and the second set of results to the external database of prior profiling test results;
    wherein the recommendations comprise a MPI_Send bandwidth per process ID and a recommended type of interconnect between nodes.

* * * * *